(12) United States Patent
Huang et al.

(10) Patent No.: US 9,277,559 B2
(45) Date of Patent: Mar. 1, 2016

(54) SHARING RADIO RESOURCES AMONG DEVICES OF DIFFERENT DEVICE CLASSES

(71) Applicant: Verizon Patent and Licensing Inc., Basking Ridge, NJ (US)

(72) Inventors: Ye Huang, San Ramon, CA (US); Jin Yang, Orinda, CA (US); Maria G. Lam, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/250,946

(22) Filed: Apr. 11, 2014

(65) Prior Publication Data

US 2015/0296499 A1    Oct. 15, 2015

(51) Int. Cl.
*H04W 4/00*       (2009.01)
*H04W 72/04*      (2009.01)
(52) U.S. Cl.
CPC ................................ *H04W 72/048* (2013.01)
(58) Field of Classification Search
None
See application file for complete search history.

(56) References Cited

U.S. PATENT DOCUMENTS

2001/0019543 A1*  9/2001  Mueckenheim et al. ..... 370/329
2013/0155964 A1*  6/2013  Miller ................... H04W 28/24
                                                          370/329

* cited by examiner

*Primary Examiner* — Afshawn Towfighi

(57) ABSTRACT

A base station may receive a resource request, from a device, that includes a request to access a radio resource. The base station may determine a device class to which the device belongs. The base station may determine an amount of radio resources permitted to be allocated to devices belonging to the device class, may determine an amount of radio resources being utilized by devices belonging to the device class, and may compare the amounts. The base station may determine whether radio resources are available to be allocated to the device based on comparing the amounts, and may process the resource request based on the determination. The base station may grant the resource request when radio resources are available to be allocated to the device, and may deny or postpone the resource request when radio resources are not available to be allocated to the device.

20 Claims, 10 Drawing Sheets

SHARING RADIO RESOURCES AMONG DEVICES OF DIFFERENT DEVICE CLASSES

BACKGROUND

Radio resource management may refer to system-level control of radio transmission characteristics in wireless communication systems, such as cellular networks. Radio resource management may involve strategies and algorithms for controlling allocation of radio resources (e.g., of a cellular base station) to user devices.

DETAILED DESCRIPTION OF PREFERRED EMBODIMENTS

The following detailed description of example implementations refers to the accompanying drawings. The same reference numbers in different drawings may identify the same or similar elements.

For cellular network operators, the growth in the quantity of devices capable of connecting to the cellular network presents resource-sharing challenges. For example, a growing number of machine-to-machine (M2M) devices are capable of communicating with one another using the cellular network. These M2M devices are competing with user devices (e.g., cell phones) for limited radio resources, which may cause a poor user experience, such as network congestion (e.g., resulting in service rendering problems to human users). Devices of different devices classes (e.g., M2M devices, user devices, etc.) are not typically differentiated by network devices or network elements, such as base stations. Implementations described herein permit differentiated treatment of devices belonging to different device classes, thereby permitting a cellular network operator to exert greater control over how network resources are allocated and how the traffic is handled.

Figure 1:
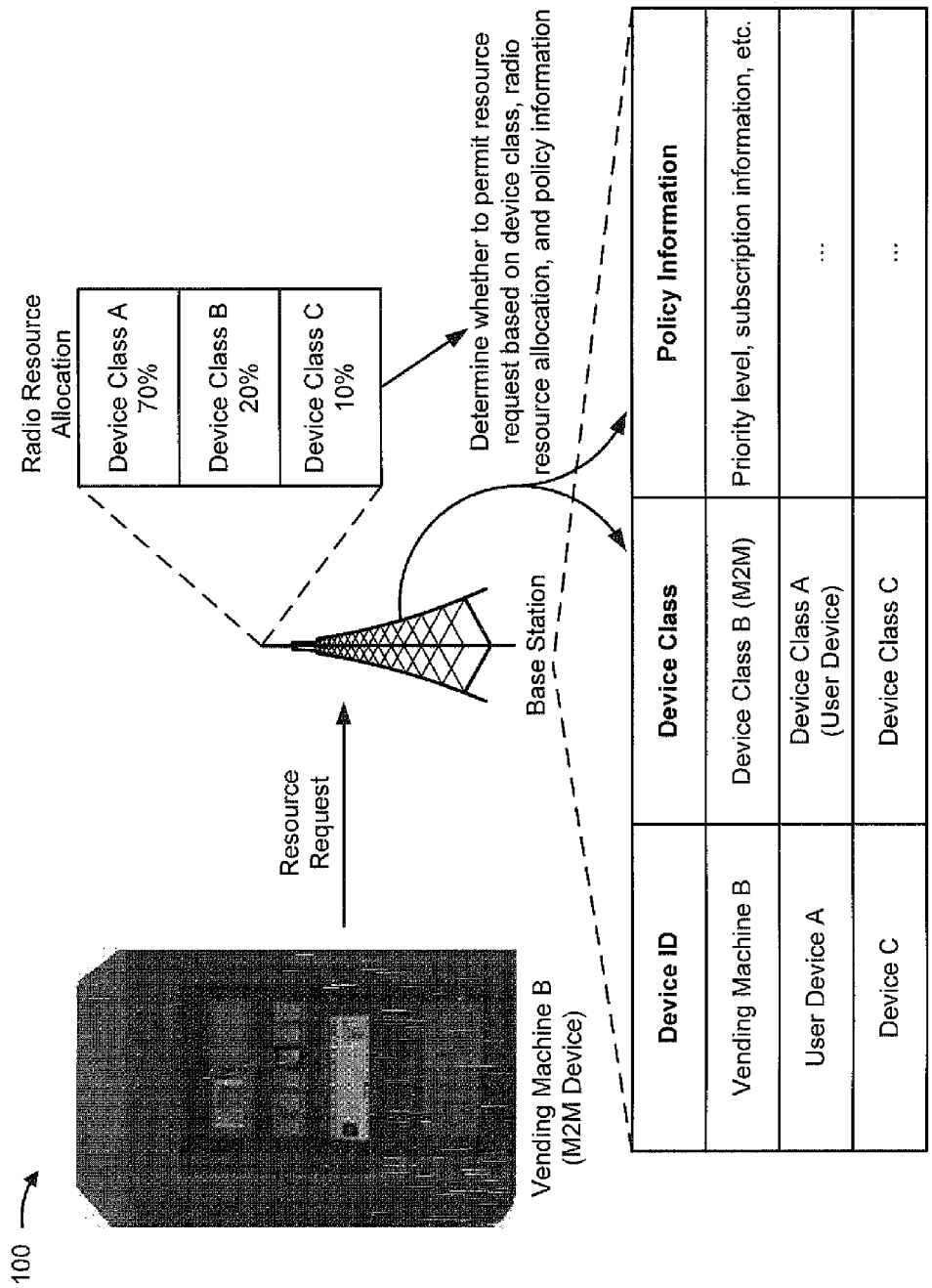
FIG. 1 is a diagram of an overview of an example implementation described herein.

FIG. 1 is a diagram of an overview of an example implementation 100 described herein. As shown in FIG. 1, assume that an M2M device, shown as Vending Machine B, requests a resource from a base station (e.g., requests to connect to a cellular network, requests to be assigned a bearer, etc.) in order to connect to an application server, associated with an owner of Vending Machine B, to send a low inventory alarm for replenishing supplies of Vending Machine B. As further shown, assume that the base station has been configured to allocate 70% of radio resources to a first device class, shown as Device Class A (e.g., user devices), to allocate 20% of radio resources to a second device class, shown as Device Class B (e.g., M2M devices), and to allocate 10% of radio resources to a third device class, shown as Device Class C.

As further shown in FIG. 1, assume that the base station stores information that identifies device classes of devices that may request a resource from the base station (e.g., M2M devices, user devices, etc.), and that identifies policy information associated with those devices (e.g., priority levels, subscription information, etc.). The base station may use the device class, the radio resource allocation per device class, and the policy information to determine whether to permit or deny a resource request.

As an example, the base station may determine that Vending Machine B is an M2M device in Device Class B, and may determine whether 20% of the radio resources of the base station have already been allocated to other M2M devices in Device Class B. If so, then the base station may deny the resource request from Vending Machine B (e.g., may prevent Vending Machine B from connecting to the cellular network, from being assigned a bearer, etc.). Otherwise, the base station may permit the resource request from Vending Machine B (e.g., may permit Vending Machine B to connect to the cellular network, to be assigned a bearer, etc.). In this way, the base station may handle traffic from devices belonging to different device classes in a different manner, such that radio resources may be allocated more effectively.

Figure 2:
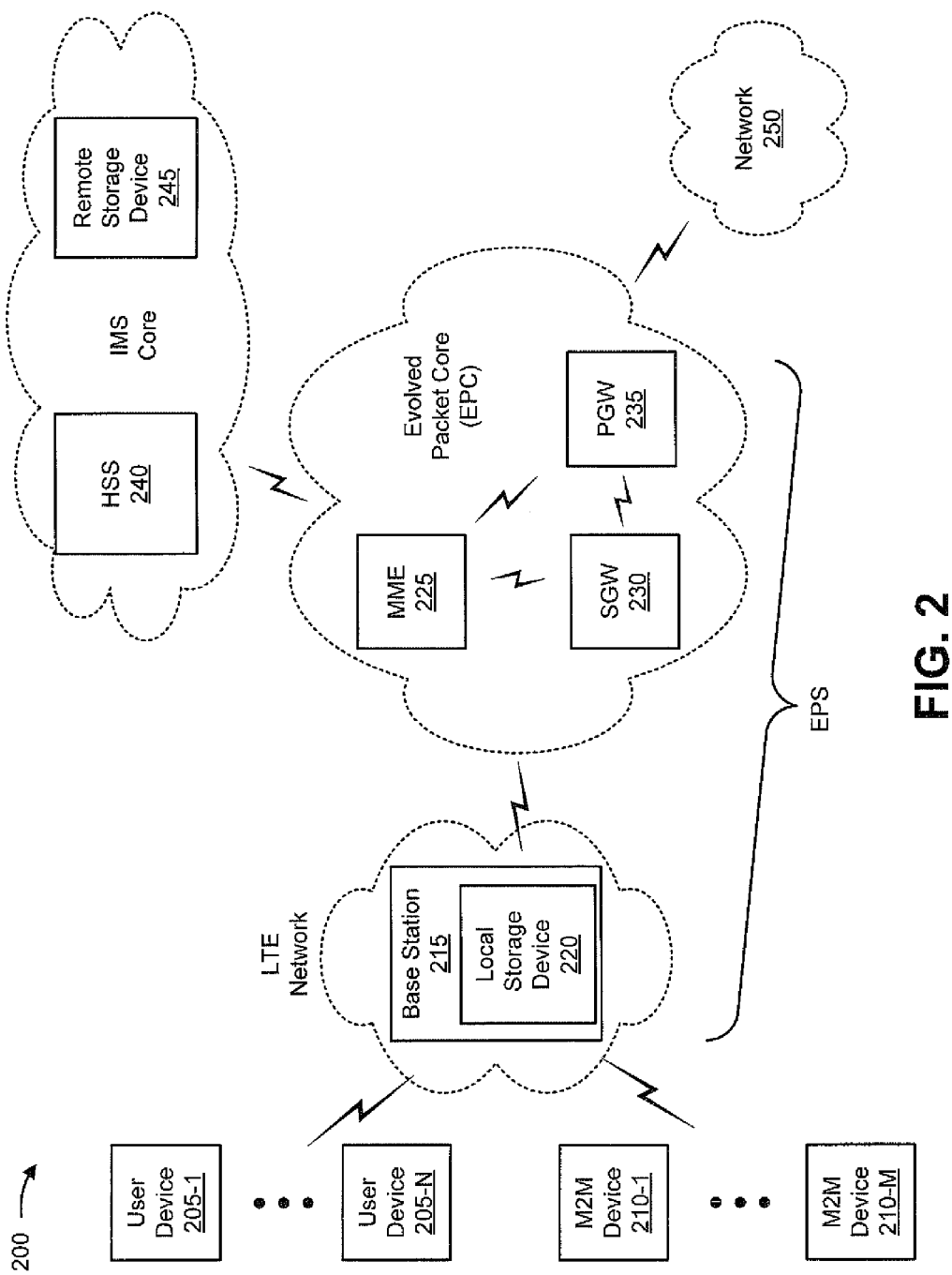
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 205-1 through 205-N(N≥1) (hereinafter referred to collectively as "user devices 205," and individually as "user device 205"), one or more M2M devices 210-1 through 210-M (M≥1) (hereinafter referred to collectively as "M2M devices 210," and individually as "M2M device 210"), and a base station 215, which may include a local storage device 220. As further shown, environment 200 may include a mobility management entity device (MME) 225, a serving gateway (SGW) 230. a packet data network gateway (PGW) 235, a home subscriber server (HSS) 240, a remote storage device 245, and a network 250. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 215 that take the form of evolved Node Bs (eNBs) via which user devices 205 and/or M2M devices 210 communicate with the EPC. The EPC may include MME 225, SGW 230, and PGW 235 that enable user devices 205 and/or M2M devices 210 to communicate with network 250 and/or an Internet protocol (IP) multimedia subsystem (IMS) core. The IMS core may include HSS 240 and/or remote storage device 245, and may manage device registration and authentication, session initiation, device class information, policy information, etc., associated with user devices 205 and/or M2M devices 210. HSS 240 and/or remote storage device 245 may reside in the EPC and/or the IMS core.

User device 205 may include one or more devices capable of communicating with base station 215 and/or a network (e.g., network 250). User device 205 may include a device belonging to a first device class. For example, user device 205 may include a wireless communication device, a radiotelephone, a personal communications system (PCS) terminal (e.g., that may combine a cellular radiotelephone with data processing and data communications capabilities), a personal digital assistant (PDA), a smart phone, a laptop computer, a tablet computer, a personal gaming system, and/or a similar device. User device 205 may send traffic to and/or receive traffic from network 250 (e.g., via base station 215, SGW 230, and/or PGW 235).

Similarly, M2M device 210 may include one or more devices capable of communicating with base station 215 and/or a network (e.g., network 250). M2M device 210 may include a device belonging to a second device class that is different from the first device class to which user device 205 belongs. For example, M2M device 210 may include a wireless communication device, a vending machine, a home monitoring device, an alarm system, a parking meter, a utility meter, a sensing device (e.g., an environment sensor, such as a thermometer, a pressure sensor, a temperature sensor, a smoke alarm, etc.), an appliance (e.g., a refrigerator, a washing machine, a dryer, a dishwasher, etc.), and/or a similar device. M2M device 210 may send traffic to and/or receive traffic from network 250 (e.g., via base station 215, SGW 230, and/or PGW 235).

Base station 215 may include a device capable of transferring traffic, such as audio, video, text, and/or other traffic, destined for and/or received from user device 205 and/or M2M device 210. In some implementations, base station 215 may include an eNB associated with the LTE network that receives traffic from and/or sends traffic to network 250 via SGW 230, and/or PGW 235. Additionally, or alternatively, one or more base stations 215 may be associated with a RAN that is not associated with the LTE network. Base station 215 may send traffic to and/or receive traffic from user device 205 and/or M2M device 210 via an air interface. In some implementations, base station 215 may include a small cell base station, such as a base station of a microcell, a picocell, and/or a femtocell.

Local storage device 220 may include one or more devices capable of storing device class information, policy information, etc., associated with user devices 205 and/or M2M devices 210. In some implementations, different base stations 215 in the LTE network may include separate local storage devices 220 that store information associated with user devices 205 and/or M2M devices 210 in a service area served by base station 215. Base station 215 may update local storage device 220 based on information stored by HSS 240 and/or remote storage device 245, in some implementations.

MME 225 may include one or more devices, such as one or more servers, capable of managing authentication, activation, deactivation, and mobility functions associated with user device 205 and/or M2M device 210. In some implementations, MME 225 may perform operations relating to authentication of user device 205 and/or M2M device 210. Additionally, or alternatively, MME 225 may facilitate the selection of a particular SGW 230 and/or a particular PGW 235 to serve traffic to and/or from user device 205 and/or M2M device 210. MME 225 may perform operations associated with handing off user device 205 and/or M2M device 210 from a first base station 215 to a second base station 215 when user device 205 and/or M2M device 210 is transitioning from a first cell associated with the first base station 215 to a second cell associated with the second base station 215. Additionally, or alternatively, MME 225 may select another MME (not pictured), to which user device 205 and/or M2M device 210 should be handed off (e.g., when user device 205 and/or M2M device 210 moves out of range of MME 225). In some implementations, different MMEs 225 may handle operations associated with devices belonging to different device classes, such as user device 205 and M2M device 210.

SGW 230 may include one or more devices capable of routing packets. For example, SGW 230 may include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 230 may aggregate traffic received from one or more base stations 215 associated with the LTE network, and may send the aggregated traffic to network 250 (e.g., via PGW 235) and/or other network devices associated with the EPC and/or the IMS core. SGW 230 may also receive traffic from network 250 and/or other network devices, and may send the received traffic to user device 205 and/or M2M device 210 via base station 215. Additionally, or alternatively, SGW 230 may perform operations associated with handing off user device 205 and/or M2M device 210 to and/or from an LTE network. In some implementations, different SGWs 230 may handle operations associated with devices belonging to different device classes, such as user device 205 and M2M device 210.

PGW 235 may include one or more devices capable of providing connectivity for user device 205 and/or M2M device 210 to external packet data networks (e.g., other than the depicted EPC and/or LTE network). For example, PGW 235 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 235 may aggregate traffic received from one or more SGWs 230, and may send the aggregated traffic to network 250. Additionally, or alternatively, PGW 235 may receive traffic from network 250, and may send the traffic to user device 205 and/or M2M device 210 via SGW 230 and base station 215. In some implementations, different PGWs 235 may handle operations associated with devices belonging to different device classes, such as user device 205 and M2M device 210.

HSS 240 may include one or more devices, such as one or more servers, capable of managing subscription and/or other information associated with one or more user devices 205. For example, HSS 240 may receive, store, and/or provide device class information, policy information, etc., associated with user devices 205. In some implementations, HSS 240 may be used to register user device 205, and may be accessed by base station 215 to make decisions regarding network access, resource allocation, quality of service, etc., associated with user device 205. Additionally, or alternatively, HSS 240 may be accessed by base station 215 to update information stored by local storage device 220.

Remote storage device 245 may include one or more devices, such as one or more servers, capable of managing subscription and/or other information associated with one or more M2M devices 210. For example, remote storage device 245 may receive, store, and/or provide device class information, policy information, etc., associated with M2M devices 210. In some implementations, remote storage device 245 may be used to register M2M device 210, and may be accessed by base station 215 to make decisions regarding network access, resource allocation, quality of service, etc., associated with M2M device 210 (and/or devices belonging to another device class). Remote storage device 245 may store information associated with multiple base stations 215, and may be used to update information stored by local storage device 220 associated with a particular base station 215.

Network 250 may include one or more wired and/or wireless networks. For example, network 250 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. For example, environment 200 may include devices similar to user device 205 and/or M2M device 210 that belong to other device classes (e.g., other than a user device class or an M2M device class). Furthermore, two or more devices shown in FIG. 2 may be implemented within a single device, or a single device shown in FIG. 2 may be implemented as multiple, distributed devices. For example, HSS 240 and remote storage device 245 may be implemented within a single device. Additionally, or alternatively, a set of devices (e.g., one or more devices) of environment 200 may perform one or more functions described as being performed by another set of devices of environment 200.

Figure 3:
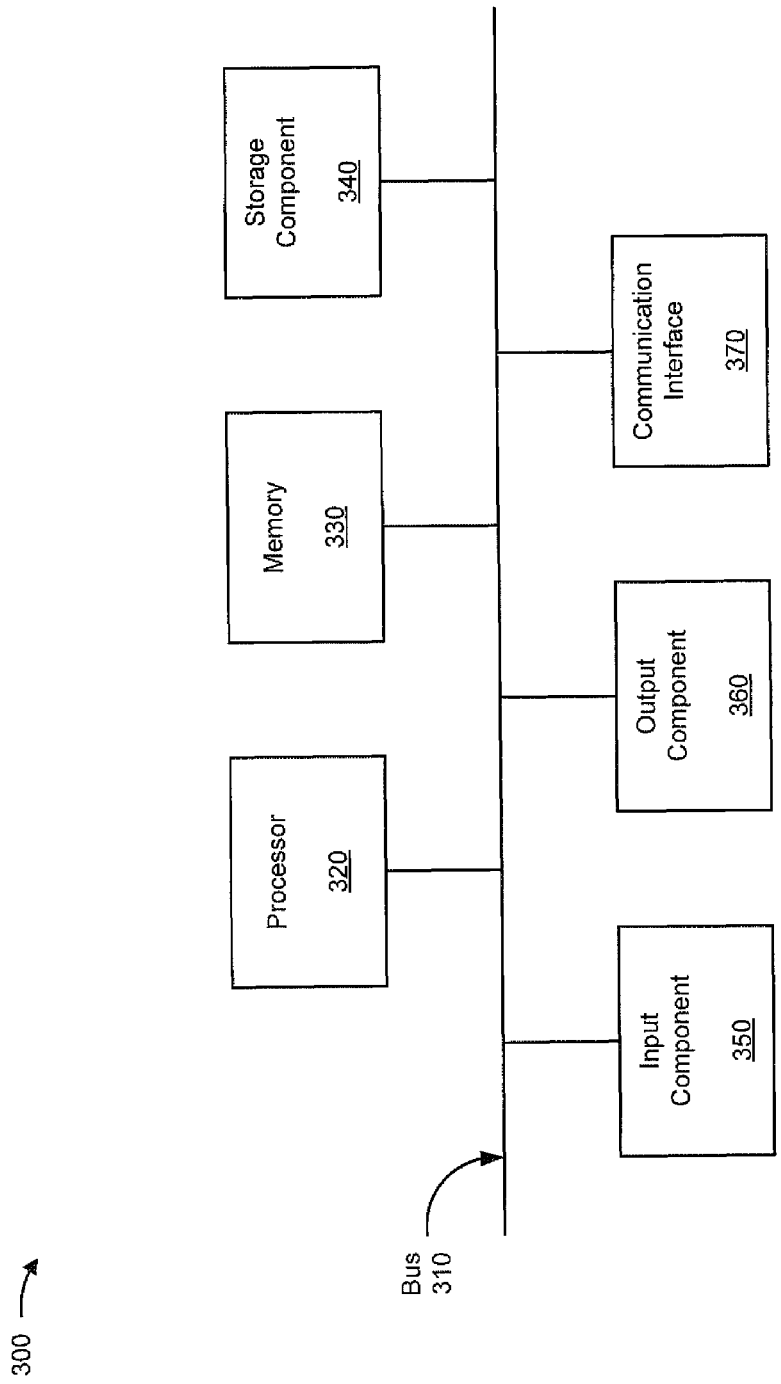
FIG. 3 is a diagram of example components of one or more devices of FIG. 2.

FIG. 3 is a diagram of example components of a device 300. Device 300 may correspond to user device 205, M2M device 210, base station 215, local storage device 220, MME 225, SGW 230, PGW 235, HSS 240, and/or remote storage device 245. In some implementations, user device 205, M2M device 210, base station 215, local storage device 220, MME 225, SGW 230, PGW 235, HSS 240, and/or remote storage device 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
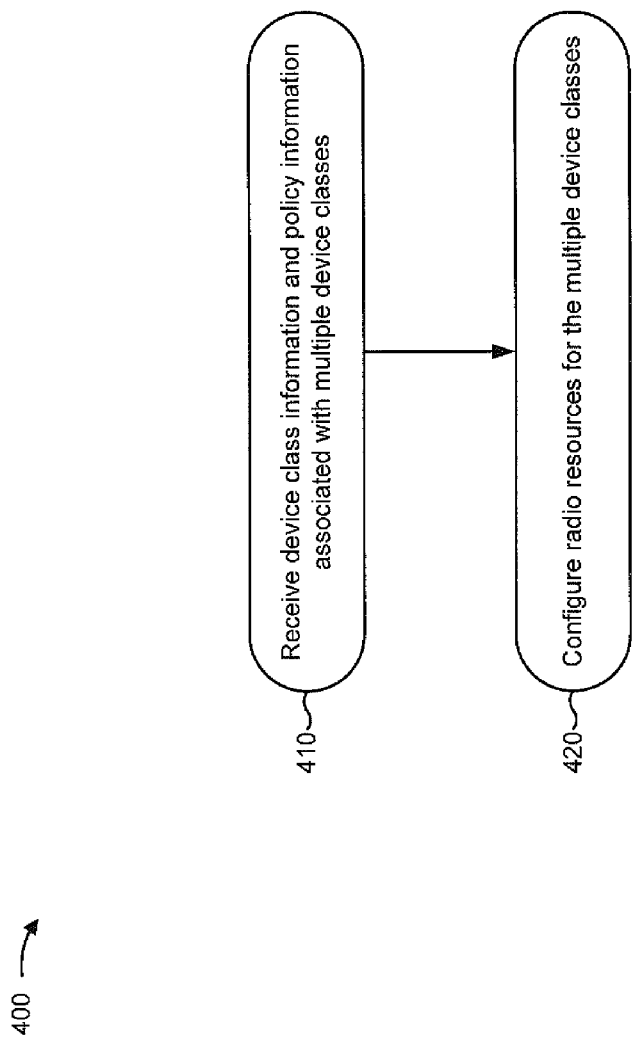
FIG. 4 is a flow chart of an example process for storing information to enable sharing of radio resources among devices belonging to different device classes.

FIG. 4 is a flow chart of an example process 400 for storing information to enable sharing of radio resources among devices belonging to different device classes. In some implementations, one or more process blocks of FIG. 4 may be performed by base station 215. In some implementations, one or more process blocks of FIG. 4 may be performed by another device or a group of devices separate from or including base station 215, such as user device 205, M2M device 210, local storage device 220, MME 225, SGW 230, PGW 235, HSS 240, and/or remote storage device 245.

As shown in FIG. 4, process 400 may include receiving device class information and policy information associated with multiple device classes (block 410). For example, base station 215 (e.g., and/or local storage device 220) may receive device class information and policy information associated with multiple device classes. In some implementations, base station 215 may receive the device class information and the policy information from HSS 240 and/or remote storage device 245. For example, when user device 205 registers with a cellular network service provider, HSS 240 may store device class information and/or policy information associated with user device 205. Similarly, when M2M device 210 registers with the cellular network service provider, remote storage device 245 may store device class information and/or policy information associated with M2M device 210. When a subscriber, associated with user device 205 and/or M2M device 210, updates subscription information (e.g., device class information, policy information, etc.), HSS 240 and/or remote storage device 245 may store the updated subscription information.

Base station 215 may periodically request and/or receive device class information and/or policy information from HSS 240 and/or remote storage device 245, in some implementations. For example, when HSS 240 and/or remote storage device 245 receive new or updated information, HSS 240 and/or remote storage device 245 may provide the new or updated information to base station 215 (e.g., for storage by local storage device 220).

As another example, when base station 215 receives a resource request from user device 205 and/or M2M device 210, base station 215 may search a data structure, stored by local storage device 220, for device class information and/or policy information associated with user device 205 and/or M2M device 210. If the device class and/or policy information cannot be found in local storage device 220, then base station 215 may request the device class and/or policy information from HSS 240 and/or remote storage device 245 (e.g., for storage by local storage device 220). Additionally, or alternatively, if the device class and/or policy information is outdated (e.g., has not been updated for a threshold amount of time), then base station 215 may request the device class and/or policy information from HSS 240 and/or remote storage device 245.

The device class information may include information that identifies a device class of a particular device, such as user device 205 and/or M2M device 210. For example, the particular device may be identified by a device identifier, such as an international mobile subscriber identifier (IMSI), a mobile equipment identifier (MEI), a mobile telephone number (MTN), a serial number, a media access control (MAC) address, or the like. The device class information may identify a relationship between a particular device identifier and a device class. In some implementations, a device class may include a user device class (e.g., for user devices 205), an M2M device class (e.g., for M2M devices 210), and/or other device classes (e.g., a premium subscriber device class, a normal subscriber device class, a device class based on a device type, such as a cell phone, a smart phone, a laptop, a tablet, etc., or the like). While some implementations are described herein with respect to two device classes (e.g., a user device class and an M2M device class), some implementations may include more than two device classes.

The policy information may include information that identifies a manner in which resource requests and/or traffic, associated with a particular device class, is to be handled by one or more devices of environment 200 (e.g., base station 215, MME 225, SGW 230, PGW 235, etc.). For example, base station 215 may use the policy information to determine whether to grant or deny a resource request received from user device 205 and/or M2M device 210. Additionally, or alternatively, base station 215 may use the policy information to determine how to allocate radio resources to user device 205 and/or M2M device 210.

As an example, the policy information may identify one or more quality of service class indicator (QCI) values associated with a particular device class. A QCI value may be used to identify characteristics of a packet and/or a bearer that carries the packet, such as a type of communication associated with the packet and/or the bearer (e.g., conversational voice, conversational video, real-time gaming, streaming video, Internet protocol multimedia subsystem signaling, streaming video, web, e-mail, etc.), a priority level of the packet and/or the bearer (e.g., a relative priority compared to other packets and/or bearers associated with different QCI classes), whether the packet and/or the bearer is associated with a guaranteed bit rate service or a non-guaranteed bit rate service, a permissible transmission delay associated with the packet and/or the bearer, a permissible packet error loss rate associated with the packet and/or the bearer, etc. Base station 215 may use a QCI value to allocate resources, associated with particular services, to devices. In some implementations, base station 215 may allocate QCI values (or another range of priority levels) to different types of traffic (e.g., different applications) associated with user devices 205 and/or M2M devices 210.

As another example, the policy information may identify one or more allocation and retention priority (ARP) values associated with a particular device class. Base station 215 may use an ARP value to determine a priority level for allocating a service and/or a bearer to a device. In some implementations, a particular device class may be associated with a set of QCI values and/or ARP values, and base station 215 may use these values to differentiate traffic treatment for different devices included in the particular device class. Additionally, or alternatively, different device classes may use the same set of QCI values and/or ARP values, or may use a different set of QCI values and/or ARP values.

By using multiple classes of devices, congestion control can be applied to a particular class of devices, with a particular QCI and/or ARP value, without impacting devices of other classes (e.g., without dropping devices of other classes, without denying resources to devices of other classes, etc.). For example, when base station 215 and/or a cell associated with base station 215 is congested, an M2M device 210, such as a utility meter (e.g., with a low priority as indicated by a QCI and/or ARP value), may be denied resources until the congestion is resolved. However, a user device 205, with the same QCI and/or ARP value as M2M device 210, may be permitted to access resources. Thus, devices of different classes, with the same QCI and/or ARP value (or other priority level value), may be treated in a different manner.

As another example, the policy information may identify an aggregated maximum bit rate (AMBR) for a device class, a time period (e.g., a date window, a time window, a day of the week, etc.) during which to grant or deny resource requests by devices belonging to the device class, a geographic location in which devices belonging to the device class are to be granted or denied access to a resource (e.g., a geographic positioning system (GPS) location, a particular cell associated with a particular base station 215, etc.), subscription information associated with devices belonging to the device class (e.g., a subscriber class, such as a premium subscriber, a normal subscriber, etc.), preemption information associated with devices and/or device classes (e.g., information identifying devices and/or devices classes that can preempt other devices and/or devices classes, information identifying devices and/or device classes that can be preempted, etc.), or the like.

As further shown in FIG. 4, process 400 may include configuring radio resources for the multiple device classes (block 420). For example, base station 215 may configure, for each device class, an amount (e.g., a quantity and/or a percentage) of radio resources to be allocated to each device class. A radio resource may refer to a bearer, a physical resource block (PRB), a radio resource control (RRC) connection, or the like. The respective allocations to different device classes may be referred to herein as a resource allocation profile.

In some implementations, the resource allocation profile may be associated with a particular time period. For example, base station 215 may use a first resource allocation profile (e.g., 80% of resources allocated to user devices 205, and 20% of resources allocated to M2M devices 210) during a first time period (e.g., from 6:00 am until 11:00 pm every day of the week), and may use a second resource allocation profile (e.g., 40% of resources allocated to user devices 205, 60% of resources allocated to M2M devices 210) during a second time period (e.g., from 11:01 pm until 5:59 am every day of the week). In this way, base station 215 may handle traffic associated with different device classes in a different manner during different time periods. For example, base station 215 may allocate fewer resources to user devices 210 when users are likely to be asleep (e.g., from 11:01 pm until 5:59 am). Additionally, or alternatively, base station 215 may configure different resource allocation profiles (e.g., with different amounts of radio resource allocations) for different types of radio resources (e.g., bearers, RRC connections, PRBs, etc.).

Additionally, or alternatively, base station 215 may dynamically adjust an active resource allocation profile (e.g., a resource allocation profile currently being applied). For example, base station 215 may determine that an amount of resources currently being utilized by a particular device class satisfies a threshold, and may adjust the amount of resources allocated to the particular device class. In some implementations, base station 215 may only adjust the amount of resources after determining that the amount of resources currently being utilized by another device class also satisfies a threshold.

As an example, assume that base station 215 has allocated 50% of radio resources to user devices 205, and has allocated 50% of radio resources to M2M devices 210. Assume that user devices 205 are currently utilizing 49% of resources (e.g., within 1% of the 50% of resources allocated to user devices 205). In this case, base station 215 may determine an amount of resources being used by M2M devices 210. If M2M devices 210 are utilizing more than 40% of resources, as an example, then base station 215 may not adjust the resource allocation profile. However, if M2M devices 210 are utilizing less than 40% of resources (e.g., of the 50% allocated to M2M devices 210), then base station 215 may adjust the resource allocation profile to allocate additional resources to user devices 205, and to allocate fewer resources to M2M devices 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
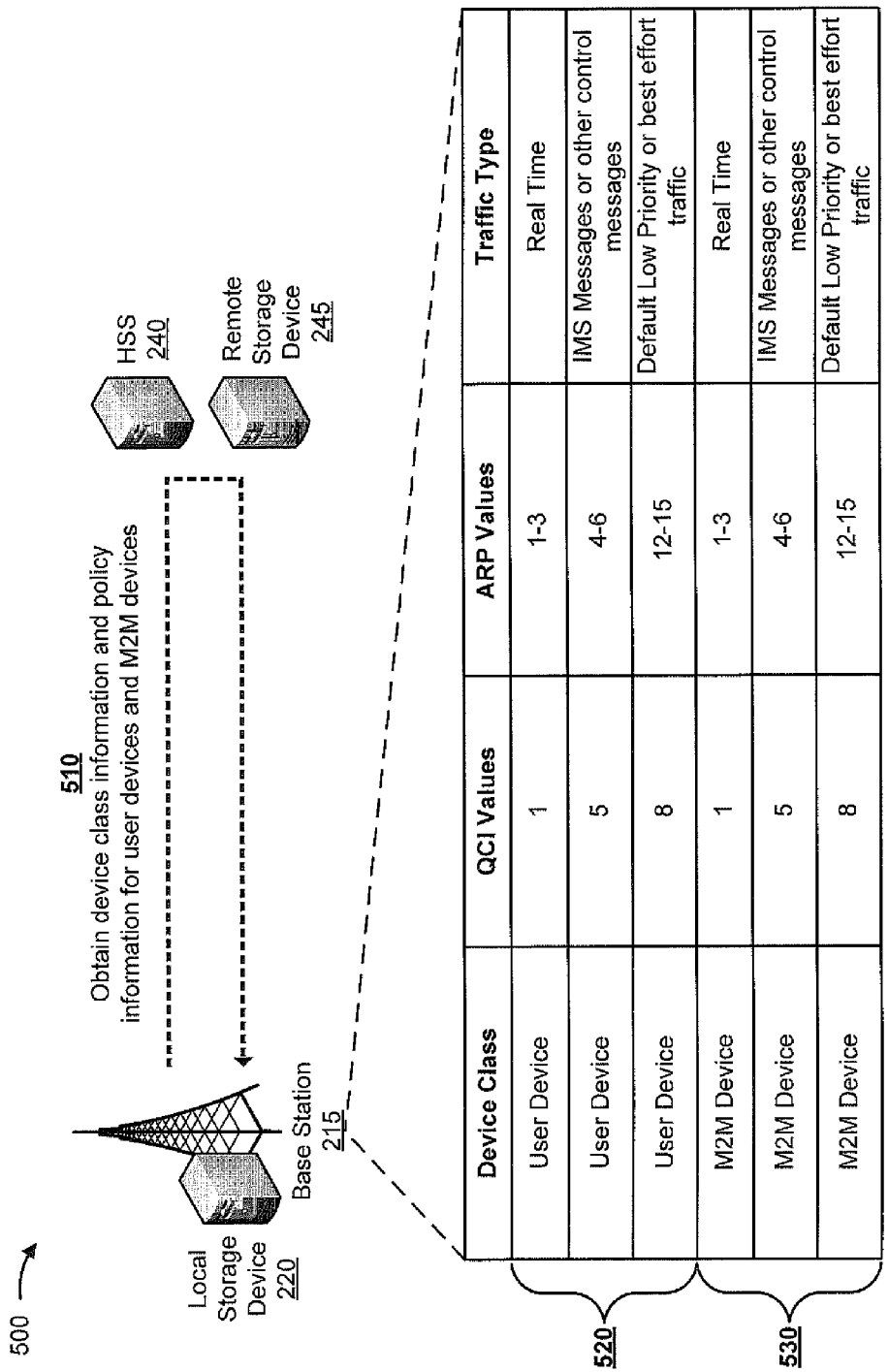
FIGS. 5A and 5B are diagrams of an example implementation relating to the example process shown in FIG. 4.
Figure 5B:
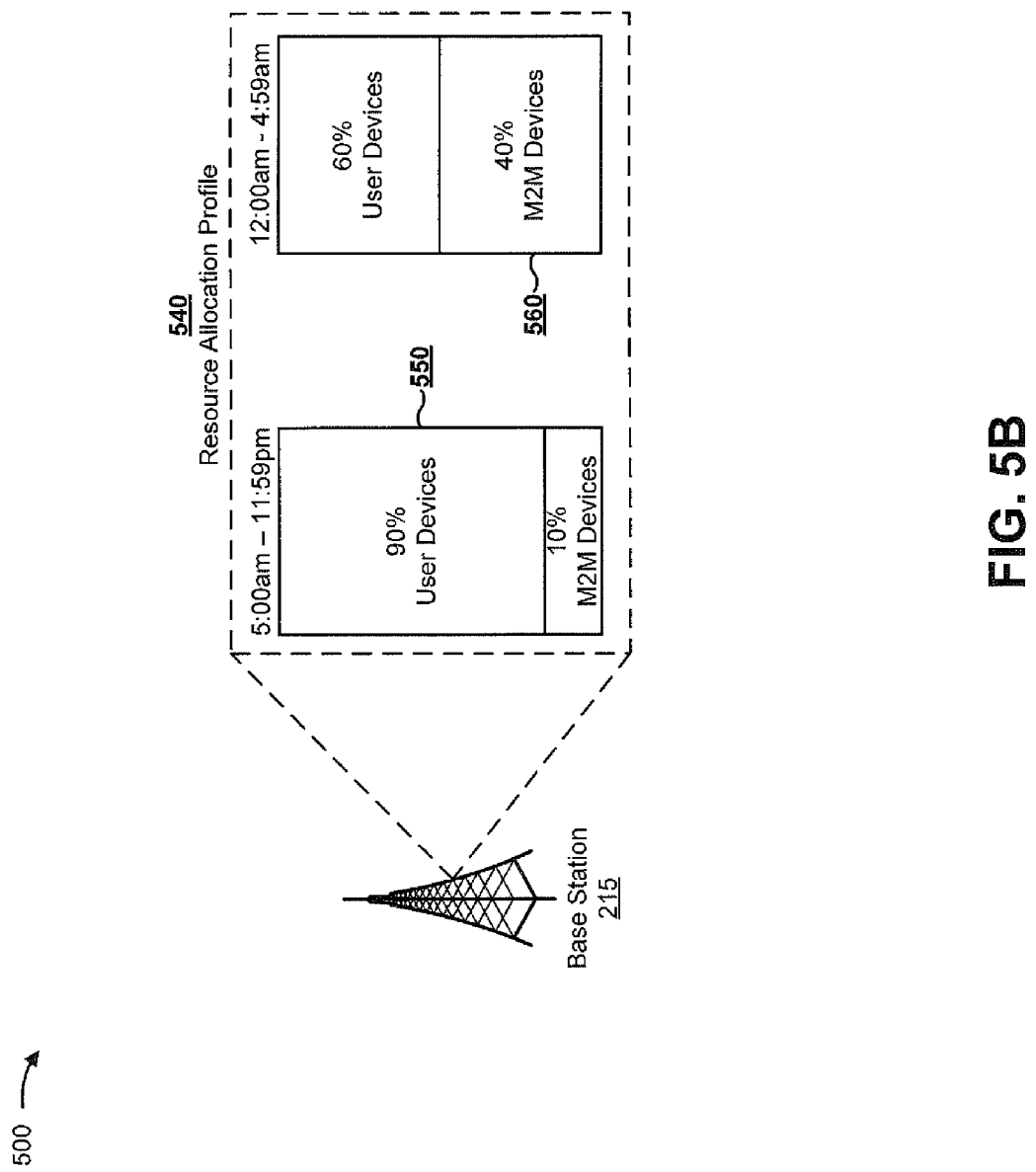

FIGS. 5A and 5B are diagrams of an example implementation 500 relating to example process 400 shown in FIG. 4. FIGS. 5A and 5B show an example of storing information to enable sharing of radio resources among devices of different device classes.

As shown in FIG. 5A, and by reference number 510, assume that base station 215 obtains device class and policy information for two device classes, shown as a user device class and an M2M device class. For example, assume that base station 215 obtains the information associated with user devices 205 from HSS 240, and that base station 215 obtains the information associated with M2M devices 210 from remote storage device 245. Assume that base station 215 stores the information in local storage device 220.

As shown by reference number 520, assume that the obtained information for the user device class identifies QCI values, ARP values, and a traffic type with which the QCI and ARP values are to be associated. Similarly, as shown by reference number 530, assume that the obtained information for the M2M device class identifies QCI values, ARP values, and a traffic type with which the QCI and ARP values are to be associated. As shown, assume that the user device class and the M2M device class use the same QCI values, ARP values, and traffic types. In some implementations, different device classes may use different QCI values, ARP values, and/or traffic types. Furthermore, assume that the obtained information includes other policy information, as described in more detail elsewhere herein.

As shown in FIG. 5B, and by reference number 540, assume that base station 215 configures a resource allocation profile for devices in the different device classes. As shown by reference number 550, assume that base station 215 configures a first resource allocation profile that allocates 90% of radio resources to user devices 205 and 10% of radio resources to M2M devices 210 between 5:00 am and 11:59 pm. As shown by reference number 560, assume that base station 215 configures a second resource allocation profile that allocates 60% of radio resources to user devices 205 and 40% of radio resources to M2M devices 210 between 12:00 am and 4:59 am. Base station 215 may receive information (e.g., from a network operator and/or via another device) to configure these resource allocation profiles. Base station 215 may use these resource allocation profiles to handle traffic associated with different device classes, as described in more detail elsewhere herein. In some implementations, base station 215 may use information other than time to select a resource allocation profile. For example, base station 215 may use a current utilization (e.g., a current load), a network condition (e.g., a congestion condition), etc. to dynamically adjust resource allocation by selecting a resource allocation profile to be applied.

As indicated above, FIGS. 5A and 5B are provided merely as an example. Other examples are possible and may differ from what was described with regard to FIGS. 5A and 5B.

Figure 6:
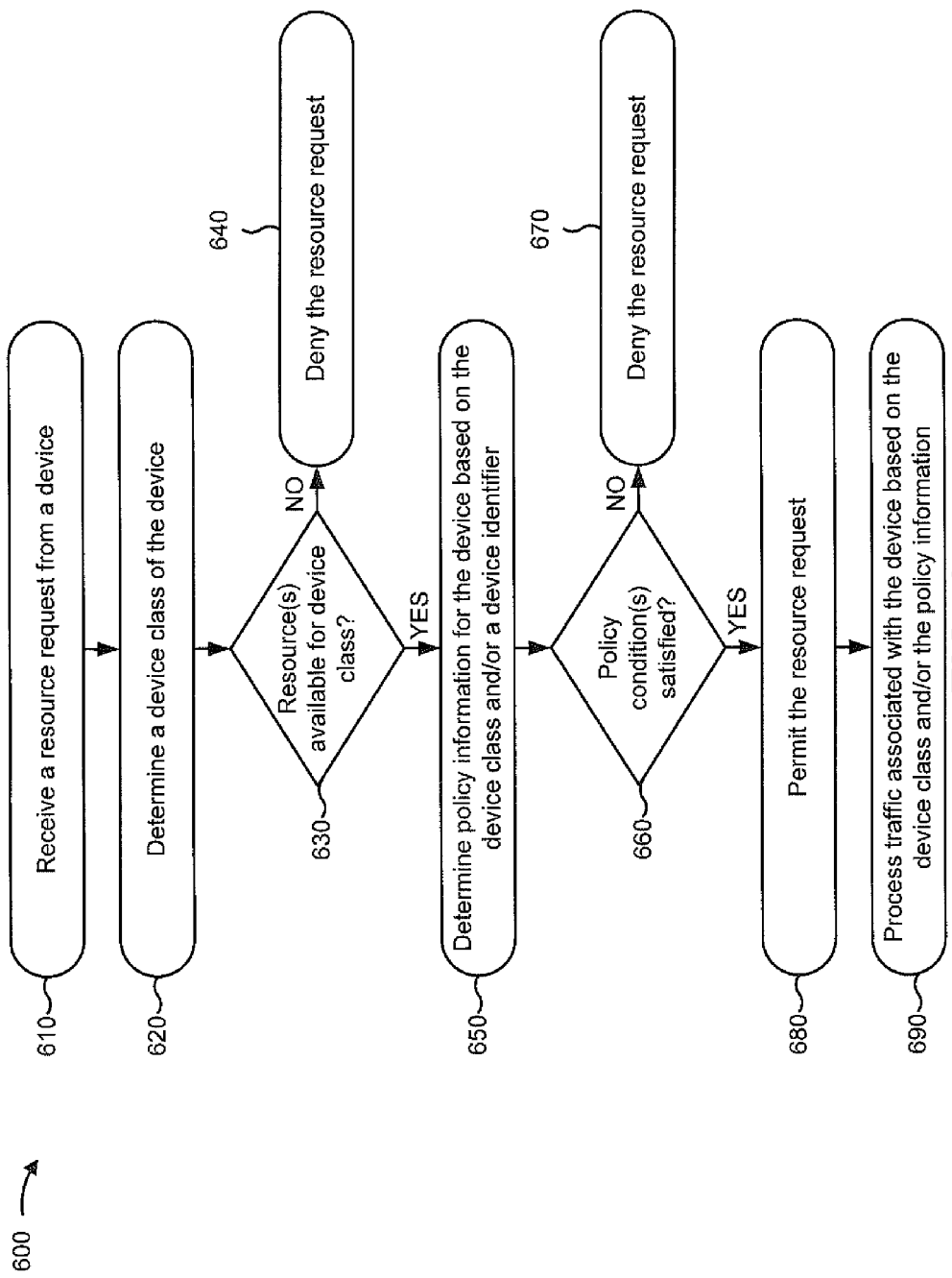
FIG. 6 is a flow chart of an example process for sharing radio resources among devices belonging to different device classes.

FIG. 6 is a flow chart of an example process 600 for sharing radio resources among devices belonging to different device classes. In some implementations, one or more process blocks of FIG. 6 may be performed by base station 215. In some implementations, one or more process blocks of FIG. 6 may be performed by another device or a group of devices separate from or including base station 215, such as user device 205, M2M device 210, local storage device 220, MME 225, SGW 230, PGW 235, HSS 240, and/or remote storage device 245.

As shown in FIG. 6, process 600 may include receiving a resource request from a device (block 610), and determining a device class of the device (block 620). For example, base station 215 may receive a resource request from a device, such as user device 205, M2M device 210, or the like. The resource request may include a request to connect to a cellular network, a request for a resource (e.g., a bearer, a PRB, etc.), or the like. The resource request may include a device identifier that identifies the device. The device identifier may include, for example, an international mobile subscriber identity (IMSI), a mobile telephone number (MTN), a serial number, a media access control (MAC) address, a network address, a mobile equipment identifier (MEI), etc. Base station 215 may use the device identifier to determine a device class of the device.

In some implementations, base station 215 may search a data structure, stored by local storage device 220, to identify a device class associated with the device identifier. Additionally, or alternatively, base station 215 may provide the device identifier to another device (e.g., HSS 240 and/or remote storage device 245), and may receive information that identifies a device class associated with the device identifier. Additionally, or alternatively, the resource request may include information that identifies a device class to which the device belongs.

In some implementations, base station 215 may determine whether device class information, associated with the device identifier, is stored by local storage device 220. If local storage device 220 does not store the device class information for the device identifier, or if the device class information is outdated (e.g., has not been updated for a threshold amount of time), then base station 215 may request the device class information from HSS 240 and/or remote storage device 245, and may update local storage device 220 with device class information received from HSS 240 and/or remote storage device 245.

As further shown in FIG. 6, process 600 may include determining whether resources are available for the device class (block 630). For example, base station 215 may determine whether radio resources are available for the device class. In some implementations, base station 215 may determine a current resource utilization, such as a quantity and/or percentage of radio resources being used by devices belonging to the device class. Base station 215 may compare the current resource utilization to an active resource allocation profile to determine whether additional resources are available to be allocated to the device class. An active resource allocation profile may refer to a resource allocation profile that base station 215 is to apply based on a set of conditions being satisfied (e.g., based on a current time, based on a current resource utilization associated with one or more device classes, based on network conditions, based on receiving an instruction to apply a particular resource allocation profile, etc.).

As further shown in FIG. 6, if resources are not available for the device class (block 630—NO), then process 600 may include denying the resource request (block 640). For example, if base station 215 determines that a current resource utilization satisfies a threshold indicated by a resource allocation profile, then base station 215 may deny the resource request. Base station 215 may deny the resource request by denying the device access to the cellular network, by denying the device access to a requested resource, or the like.

As further shown in FIG. 6, if resources are available for the device class (block 630—YES), then process 600 may include determining policy information for the device based on the device class and/or a device identifier (block 650). For example, base station 215 may determine any of the policy information described elsewhere herein.

In some implementations, base station 215 may search a data structure, stored by local storage device 220, to identify the policy information based on the device class and/or the device identifier. Additionally, or alternatively, base station 215 may provide the device identifier and/or information that identifies the device class to another device (e.g., HSS 240 and/or remote storage device 245), and may receive policy information associated with the device identifier and/or the device class.

In some implementations, base station 215 may determine whether policy information, associated with the device identifier and/or the device class, is stored by local storage device 220. If local storage device 220 does not store the policy information or if the policy information is outdated, then base station 215 may request the policy information from HSS 240 and/or remote storage device 245, and may update local storage device 220 with policy information received from HSS 240 and/or remote storage device 245.

The policy information may include a set of policy conditions for permitting and/or denying the resource request, in some implementations. For example, the policy information may identify a priority level associated with the device and/or the device class (e.g., a QCI value, an ARP value, a subscriber class, etc.), an aggregated maximum bit rate permitted to be allocated to the device and/or the device class, a time period during which the device and/or the device class is permitted or denied access to requested resources, a geographic location in which the device and/or the device class is permitted or denied access to requested resources, a power saving profile associated with the device and/or the device class (e.g., whether to communicate with a device based on a power saving mode of the device), preemption information (e.g., indicating whether a device and/or device class can preempt other devices and/or devices classes, whether a device and/or a device class is pre-emptible, etc.), or the like.

In some implementations, the policy information may indicate a range of priority levels (e.g., QCI values, ARP values, etc.) or a particular priority level to be used to process traffic, associated with a particular device class, based on a current condition (e.g., a current time, a current resource utilization, a power saving profile associated with a device and/or a device class, etc.). Different device classes may be associated with the same range of priority levels, or may be associated with different ranges of priority levels.

As further shown in FIG. 6, process 600 may include determining whether a set of policy conditions, identified in the policy information, is satisfied (block 660). For example, base station 215 may determine a set of conditions included in the policy information, and may determine whether the set of conditions are satisfied. As an example, base station 215 may determine whether an aggregated bit rate, assigned to devices of the device class, satisfies a threshold; may determine whether a current time matches a permitted access time associated with the device class; may determine whether a geographic location, from which the device is requesting access, matches a permitted geographic location associated with the device class; or the like.

As further shown in FIG. 6, if the set of policy conditions are not satisfied (block 660—NO), then process 600 may include denying the resource request (block 670). For example, if base station 220 determines that the set of policy conditions are not satisfied, then base station 215 may deny the resource request. Base station 215 may deny the resource request by denying the device access to the cellular network, by denying the device access to a requested resource, or the like. Additionally, or alternatively, base station 215 may postpone the resource request (e.g., to be permitted at a later time).

As further shown in FIG. 6, if the set of policy conditions are satisfied (block 660—YES), then process 600 may include permitting the resource request (block 680), and processing traffic associated with the device based on the device class and/or the policy information (block 690). For example, if base station 215 determines that the set of policy conditions are satisfied, then base station 215 may permit the resource request. Base station 215 may permit the resource request by allowing the device to access to the cellular network, by allowing the device to access to a requested resource, or the like.

Base station 215 may process traffic, associated with the device, based on the device class and/or the policy information. In some implementations, base station 215 may route the traffic based on the device class. For example, different MMEs 225, SGWs 230, and/or PGWs 235 may handle traffic associated with different device classes. In this case, base station 215 may route the traffic to an appropriate SGW 230 based on the device class.

In some implementations, base station 215 may determine a range of priority levels (e.g., a priority level scale), associated with the device class, and may process traffic based on the range of priority levels. The range of priority levels (e.g., QCI values, ARP values, etc.) may be shared across different device classes, such that once a device is permitted access to the cellular network (e.g., once a connection request is granted), devices of different device classes may be treated according to a common range of priority levels. Additionally, or alternatively, base station 215 may apply different ranges of priority levels to different device classes, such that one device class receives priority treatment over another device class.

In some implementations, base station 215 may allocate resources to a permitted resource request by dropping and/or preempting devices with a lower priority than the device associated with the permitted resource request (e.g., by denying resource access to a lower priority device of the same device class, by denying resource access to a device associated with a lower priority device class, by removing resource access, etc.). In some implementations, base station 215 may use policy information to determine whether a device may be preempted and/or whether a device is pre-emptible. In some implementations, a device belonging to a particular device class may only preempt or be preempted by another device belonging to the same device class (e.g., based on a priority level of a type of service being used by the devices, such as a data service, a voice over LTE service, etc.). In this way, base station 215 may more efficiently manage traffic associated with different device classes. Furthermore, base station 215 may use multiple levels of differentiation (e.g., a device class and a priority level) to differentiate treatment of traffic associated with different devices.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
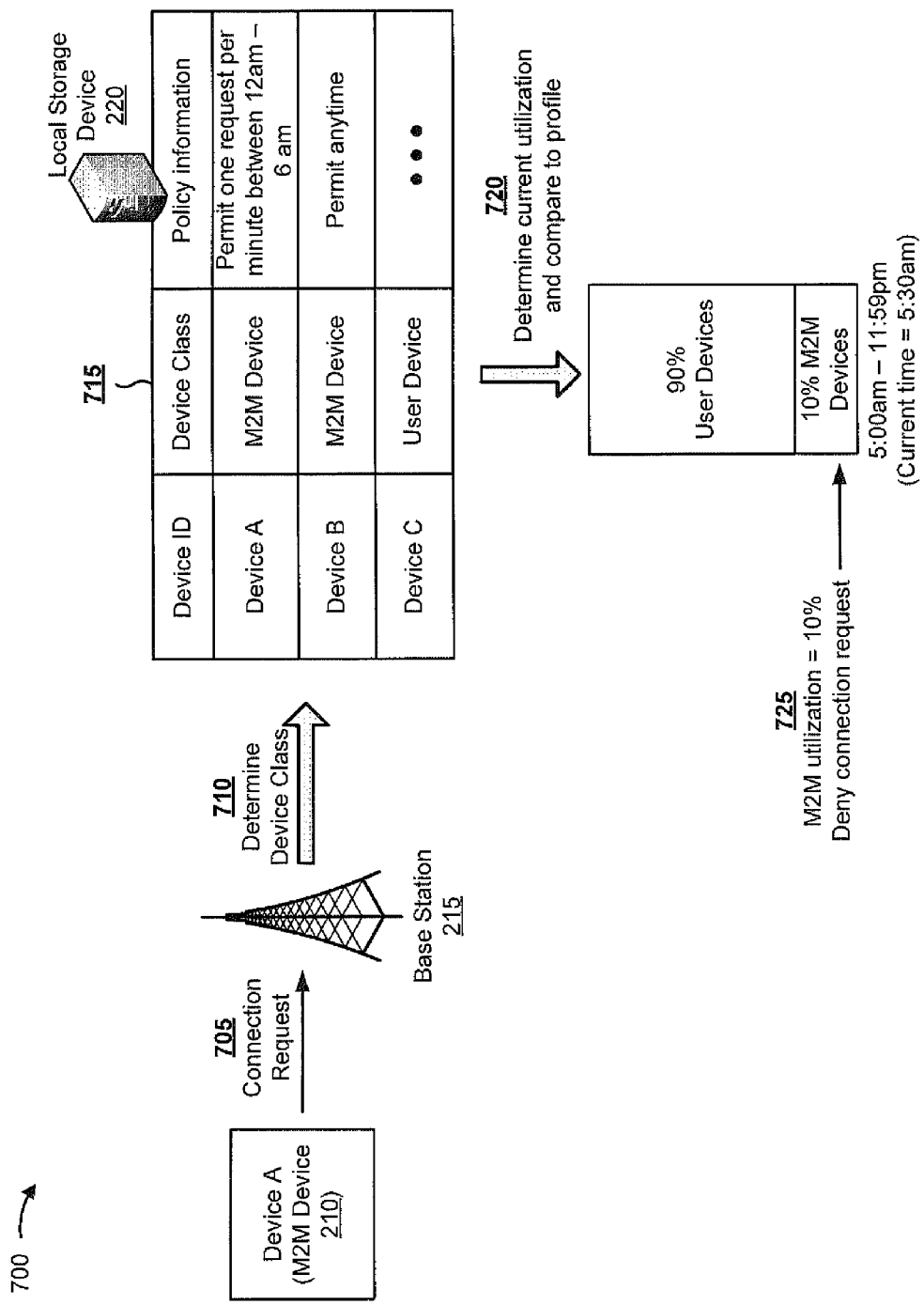
FIGS. 7A-7C are diagrams of an example implementation relating to the example process shown in FIG. 6.
Figure 7B:
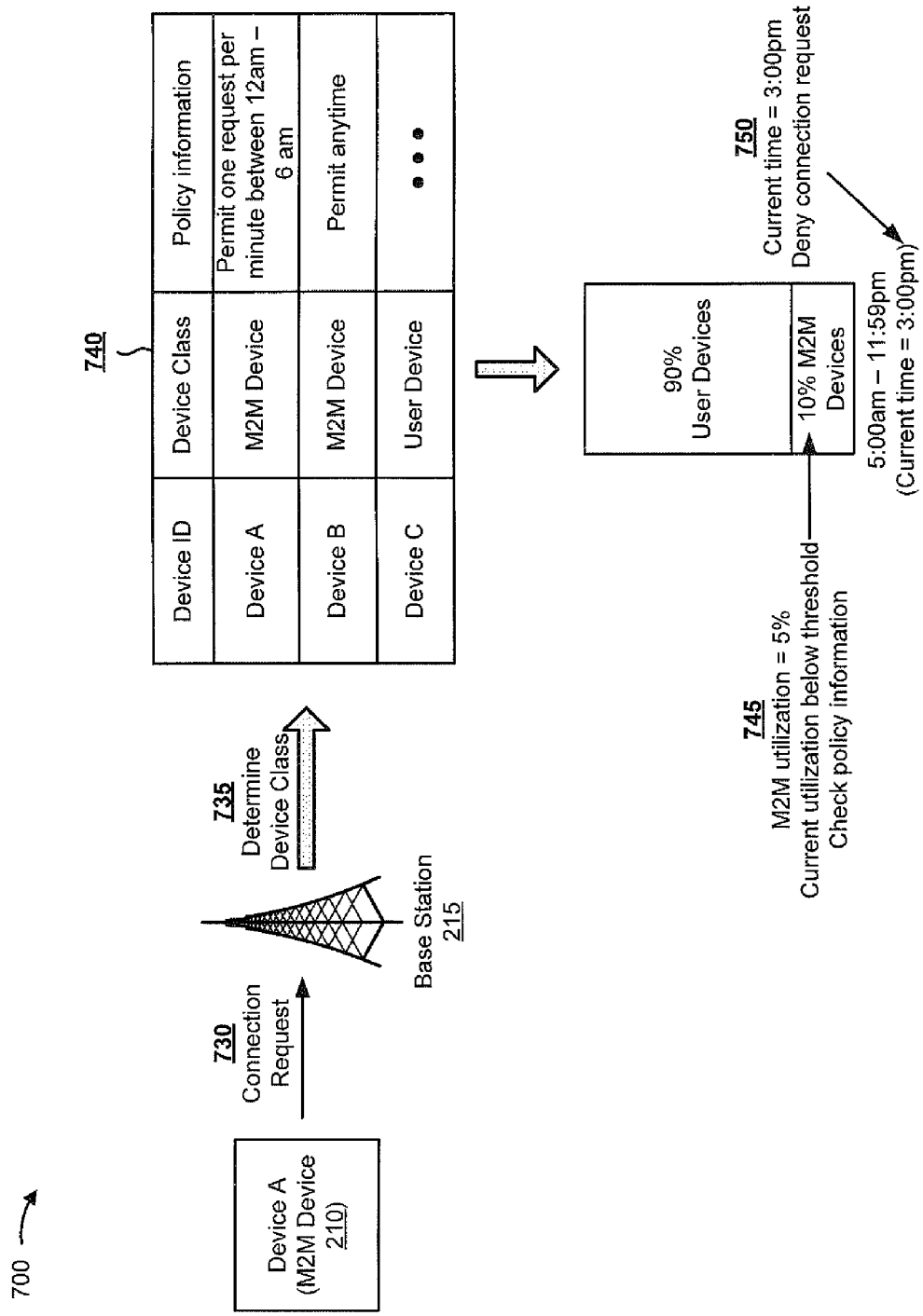
Figure 7C:
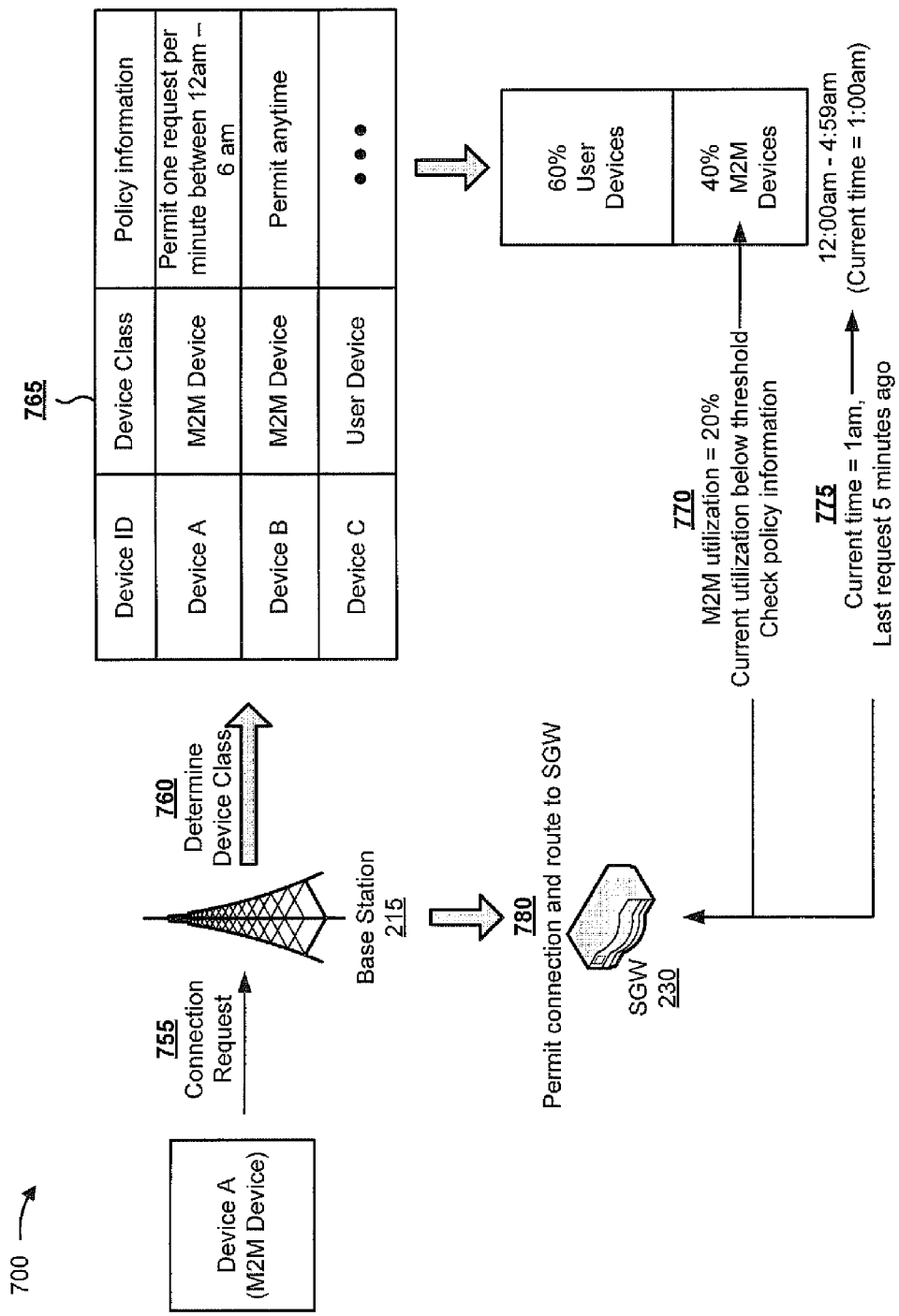

FIGS. 7A-7C are diagrams of an example implementation relating to the example process shown in FIG. 6. FIGS. 7A-7C show an example of sharing radio resources among devices belonging to different device classes As shown in FIG. 7A, and by reference number 705, assume that an M2M device 210, identified as Device A, sends a connection request to base station 215. Assume that the connection request includes a request to connect to a cellular network via base station 215, and that the connection request includes a device identifier that identifies Device A. As shown by reference number 710, assume that base station 215 determines the device class of Device A. As shown by reference number 715, assume that base station 215 causes a search of a data structure, stored by local storage device 220, to be performed using the device identifier. As shown, the search identifies that Device A belongs to an M2M device class, and identifies a policy that Device A is permitted one request per minute between 12:00 am and 6:00 am (and no requests outside of this time period).

As shown by reference number 720, assume that base station 215 determines a current utilization of radio resources, and compares the current utilization to a resource allocation profile configured by base station 215 (e.g., as described herein in connection with FIG. 5B). Assume that the current time is 5:30 am, and that during this time period, 90% of radio resources are allocated to user devices 205, and 10% of radio resources are allocated to M2M devices 210. As shown by reference number 725, assume that base station 215 determines that M2M devices 210 are currently utilizing 10% of radio resources, which is equal to a maximum amount of resources allocated to M2M devices 210 based on the resource allocation profile. Thus, assume that base station 215 denies the connection request, and does not permit Device A to connect to the cellular network.

As another example, base station 215 may permit Device A to access the cellular network if Device A has a higher priority level (e.g., a higher ARP value) than another M2M device 210 already connected to the cellular network. In this case, base station 215 may drop the other M2M device 210 with the lower priority level, and may permit Device A to access the cellular network.

As shown in FIG. 7B, and by reference number 730, assume that, at a later time, Device A sends another connection request to base station 215. As shown by reference number 735, assume that base station 215 determines the device class of Device A. As shown by reference number 740, assume that base station 215 causes a search of a data structure, stored by local storage device 220, to be performed using the device identifier. As shown, the search identifies that Device A belongs to an M2M device class, and identifies a policy that Device A is permitted one request per minute between 12:00 am and 6:00 am (and no requests outside of this time period).

Assume that base station 215 determines a current utilization of radio resources, and compares the current utilization to a resource allocation profile configured by base station 215. As shown, assume that the current time is 3:00 pm, and that during this time period, 90% of radio resources are allocated to user devices 205, and 10% of radio resources are allocated to M2M devices 210. As shown by reference number 745, assume that base station 215 determines that M2M devices 210 are currently utilizing 5% of radio resources, which is below a maximum amount of resources allocated to M2M devices 210 based on the resource allocation profile.

Based on this determination, assume that base station 215 determines whether policy conditions, included in the policy information, are satisfied. Because the policy information indicates that no requests are permitted from Device A outside of the time period from 12:00 am until 6:00 am, and the current time is 3:00 pm, assume that base station 215 denies the connection request, as shown by reference number 750. While shown as analyzing a current resource utilization before analyzing policy conditions, base station 215 may analyze policy conditions before analyzing the current resource utilization, in some implementations.

As shown in FIG. 7C, and by reference number 755, assume that, at a later time, Device A sends yet another connection request to base station 215. As shown by reference numbers 760 and 765, assume that base station 215 determines the device class of Device A and policy information associated with Device A, as described herein in connection with FIGS. 7A and 7B.

Assume that base station 215 determines a current utilization of radio resources, and compares the current utilization to a resource allocation profile configured by base station 215. Assume that the current time is 1:00 am, and that during this time period, 60% of radio resources are allocated to user devices 205, and 40% of radio resources are allocated to M2M devices 210. As shown by reference number 770, assume that base station 215 determines that M2M devices 210 are currently utilizing 20% of radio resources, which is below a maximum amount of resources allocated to M2M devices 210 based on the resource allocation profile.

Based on this determination, assume that base station 215 determines whether policy conditions, included in the policy information, are satisfied. The policy information indicates that requests from Device A may only be permitted between 12:00 am and 6:00 am, and that only one request per minute is permitted. As shown by reference number 775, assume that base station 215 determines that the current time of 1:00 am is within the time period that Device A is permitted to access resources (e.g., is between 12:00 am and 6:00 am), and that the last request was received from Device A 5 minutes ago. Thus, as shown by reference number 780, base station 215 permits the connection request, and routes traffic associated with Device A to SGW 230 (e.g., which may be configured to handle traffic associated with M2M devices 210).

As indicated above, FIGS. 7A-7C are provided merely as an example. Other examples are possible and may differ from what was described with regard to FIGS. 7A-7C.

Implementations described herein permit differentiated treatment of devices belonging to different device classes, thereby permitting a cellular network operator to exert greater control over how network traffic is handled.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
   one or more processors to:
      receive a resource request from a device,
         the resource request including a request to access a radio resource associated with the base station;
      determine a device class to which the device belongs from among a plurality of device classes,
         a respective device belonging to a respective device class, of the plurality of device classes, based on at least one of a device identifier for the respective device or a device type of the respective device;
      determine a resource allocation profile, from among a plurality of resource allocation profiles, based on a condition being satisfied,
         each of the plurality of resource allocation profiles identifying respective amounts of resources permitted to be allocated to each of the plurality of device classes;
      determine a first amount of radio resources permitted to be allocated to the device class based on the resource allocation profile;
      determine a second amount of radio resources being utilized by the device class;
      compare the first amount and the second amount;
      determine whether radio resources are available to be allocated to the device based on comparing the first amount and the second amount; and
      process the resource request based on determining whether radio resources are available to be allocated to the device,
         the resource request being granted when radio resources are available to be allocated to the device,
         the resource request being denied or postponed when radio resources are not available to be allocated to the device.

2. The base station of claim 1, where the one or more processors, when determining the device class to which the device belongs, are to:
   receive a device identifier that identifies the device,
      the device identifier being received from the device; and
   determine the device class based on the device identifier.

3. The base station of claim 1, where the one or more processors are further to:
configure the resource allocation profile that identifies respective amounts of resources permitted to be allocated to each of the plurality of device classes.

4. The base station of claim 1, where the one or more processors are further to:
receive information identifying the plurality of device classes;
configure a first resource allocation profile that identifies first respective amounts of resources permitted to be allocated to each of the plurality of device classes when a first condition is satisfied;
configure a second resource allocation profile that identifies second respective amounts of resources permitted to be allocated to each of the plurality of device classes when a second condition is satisfied; and
where the one or more processors, when determining the first amount of radio resources permitted to be allocated to the device class, are to:
determine whether the first condition or the second condition is satisfied;
select the first resource allocation profile or the second resource allocation profile based on determining whether the first condition or the second condition is satisfied,
the first resource allocation profile being selected when the first condition is satisfied,
the second resource allocation profile being selected when the second condition is satisfied; and
identify the first amount of radio resources using the first resource allocation profile or the second resource allocation profile that is selected.

5. The base station of claim 1, where the one or more processors are further to:
determine policy information, associated with the device, based on the device class or a device identifier that identifies the device,
the policy information including information, other than information identifying the first amount of radio resources, that identifies another condition for granting or denying the resource request; and
where the one or more processors, when processing the resource request, are to:
process the resource request based on the policy information,
the resource request being granted when the other condition is met,
the resource request being denied when the other condition is not met.

6. The base station of claim 1, where the first amount of radio resources and the second amount of radio resources identify:
a first quantity of radio resources and a second quantity of radio resources, respectively; or
a first percentage of radio resources and a second percentage of radio resources, respectively.

7. The base station of claim 1, where the condition being satisfied is based on a particular time, associated with the resource request, being during a time period associated with the resource allocation profile.

8. A non-transitory computer-readable medium storing instructions, the instructions comprising:
one or more instructions that, when executed by one or more processors, cause the one or more processors to:
receive, from a device, a request to access a radio resource associated with a base station;
determine a device class to which the device belongs from among a plurality of device classes,
a respective device belonging to a respective device class, of the plurality of device classes, based on at least one of a device identifier for the respective device or a device type of the respective device;
determine a resource allocation profile, from among a plurality of resource allocation profiles, based on a condition being satisfied,
each of the plurality of resource allocation profiles identifying respective amounts of resources permitted to be allocated to each of the plurality of device classes;
determine a first amount of radio resources permitted to be allocated to the device class based on the resource allocation profile;
determine a second amount of radio resources being utilized by the device class;
compare the first amount and the second amount;
determine whether radio resources are available to be allocated to the device based on comparing the first amount and the second amount; and
selectively grant or deny access to the radio resource based on determining whether radio resources are available to be allocated to the device,
access to the radio resource being granted when radio resources are available to be allocated to the device,
access to the radio resource being denied when radio resources are not available to be allocated to the device.

9. The non-transitory computer-readable medium of claim 8, where the one or more instructions, that cause the one or more processors to determine the device class to which the device belongs, cause the one or more processors to:
receive a device identifier that identifies the device;
cause a data structure to be searched, using the device identifier, to identify the device class; and
determine the device class based on causing the data structure to be searched.

10. The non-transitory computer-readable medium of claim 8, where the one or more instructions, when executed by the one or more processors, further cause the one or more processors to:
configure the resource allocation profile that identifies the respective amounts of resources permitted to be allocated to each of the plurality of device classes.

11. The non-transitory computer-readable medium of claim 8, where the one or more instructions, when executed by the one or more processors, further cause the one or more processors to:
receive information identifying the plurality of device classes;
configure a first resource allocation profile that identifies first respective amounts of resources permitted to be allocated to each of the plurality of device classes during a first time period;
configure a second resource allocation profile that identifies second respective amounts of resources permitted to be allocated to each of the plurality of device classes during a second time period,
the second time period being different from the first time period; and
where the one or more instructions, that cause the one or more processors to determine the first amount of radio resources permitted to be allocated to the device class, cause the one or more processors to:
determine a current time;

determine whether the current time is within the first time period or the second time period;

select the first resource allocation profile or the second resource allocation profile, as a selected resource allocation profile, based on determining whether the current time is within the first time period or the second time period, the first resource allocation profile being selected when the current time is within the first time period, the second resource allocation profile being selected when the current time is within the second time period; and identify the first amount of radio resources using the first resource allocation profile or the second resource allocation profile that is selected.

12. The non-transitory computer-readable medium of claim 8, where the one or more instructions, when executed by the one or more processors, further cause the one or more processors to:

determine policy information, associated with the device, based on the device class, the policy information including information, other than information identifying the first amount of radio resources, that identifies another condition for granting or denying the request; and where the one or more instructions, that cause the one or more processors to selectively grant or deny access to the radio resource, cause the one or more processors to:

selectively grant or deny access to the radio resource based on the policy information, access to the radio resource being granted when the other condition is met, access to the radio resource being denied when the other condition is not met.

13. The non-transitory computer-readable medium of claim 12, where the policy information identifies a quantity of requests permitted, by the device class, within a particular time period.

14. A method, comprising:

configuring, by a base station, a plurality of resource allocation profiles that each indicate respective amounts of radio resources permitted to be allocated to a respective plurality of device classes;

receiving, by the base station and from a device, a request for a radio resource associated with the base station;

determining, by the base station, a device class, of the plurality of device classes, to which the device belongs, a respective device belonging to a respective device class, of the plurality of device classes, based on at least one of a device identifier for the respective device or a device type of the respective device;

determining, by the base station, a resource allocation profile, from among the plurality of resource allocation profiles, based on a condition being satisfied;

determining, by the base station and based on the resource allocation profile, a permitted amount of radio resources permitted to be allocated to the device class;

determining, by the base station and based on the permitted amount, that radio resources are available to be allocated to the device; and providing, by the base station and to the device, access to the radio resource based on determining that radio resources are available to be allocated to the device.

15. The method of claim 14, further comprising:

determining a utilized amount of radio resources being utilized by the device class;

comparing the permitted amount and the utilized amount; and where determining that radio resources are available to be allocated to the device comprises:

determining that radio resources are available to be allocated to the device based on comparing the permitted amount and the utilized amount.

16. The method of claim 14, where determining the device class, to which the device belongs, comprises:

receiving a device identifier that identifies the device;

causing a first data structure to be searched using the device identifier;

determining that the device identifier is not included in the first data structure;

causing a second data structure to be searched, using the device identifier, to identify the device class;

determining the device class based on causing the second data structure to be searched; and causing the first data structure to be updated to include the device identifier and information that identifies the device class.

17. The method of claim 14, further comprising:

determining a range of priority levels that indicate a manner in which traffic, associated with the device, is to be processed, the range of priority levels being shared among the plurality of device classes; and processing traffic, associated with the device, based on the range of priority levels.

18. The method of claim 14, further comprising:

determining a range of priority levels that indicate a manner in which traffic, associated with the device, is to be processed, the range of priority levels being associated with the device class, the range of priority levels being different from another range of priority levels associated with another device class of the plurality of device classes; and processing traffic, associated with the device, based on the range of priority levels.

19. The method of claim 14, further comprising identifying, based on the device class, a traffic processing device for processing traffic associated with the device class; and providing traffic, associated with the device, to the identified traffic processing device.

20. The method of claim 14, where the condition being satisfied is based on a particular time, associated with the resource request, being during a time period associated with the resource allocation profile.

* * * * *